(12) United States Patent
Eiselt (10) Patent No.: US 11,476,948 B2
(45) Date of Patent: Oct. 18, 2022

(54) METHOD AND DEVICE FOR ENDLESS PHASE SHIFTING OF AN OPTICAL SIGNAL

(71) Applicant: ADVA Optical Networking SE, Meiningen (DE)

(72) Inventor: Michael Eiselt, Kirchheim (DE)

(73) Assignee: ADVA Optical Networking SE, Meiningen (DE)

( * ) Notice: Subject to any disclaimer, the term of this patent is extended or adjusted under 35 U.S.C. 154(b) by 242 days.

(21) Appl. No.: 17/005,393

(22) Filed: Aug. 28, 2020

(65) Prior Publication Data

US 2021/0067252 A1 Mar. 4, 2021

(30) Foreign Application Priority Data

Aug. 30, 2019 (EP) ..................................... 19194610

(51) Int. Cl.
*H04B 10/61* (2013.01)
*G02B 6/293* (2006.01)
*G02F 1/21* (2006.01)

(52) U.S. Cl.
CPC ....... *H04B 10/6165* (2013.01); *G02B 6/2935* (2013.01); *G02F 1/212* (2021.01)

(58) Field of Classification Search
CPC ... H04B 10/6165; G02B 6/2935; G02F 1/212; G02F 1/01
See application file for complete search history.

(56) References Cited

U.S. PATENT DOCUMENTS

| 6,091,864 A | * | 7/2000 | Hofmeister | ........... G02F 1/3136 |
| | | | | 359/254 |
| 8,787,708 B2 | | 7/2014 | Doerr | |
| 2012/0237156 A1 | | 9/2012 | Rohde et al. | |
| 2015/0078702 A1 | | 3/2015 | Dorin et al. | |

OTHER PUBLICATIONS

Doerr, "Proposed Architecture for MIMO Optical Demultiplexing Using Photonic Integration", IEEE Photonics Technology Letters, 2011, pp. 1573-1575, vol. 23, No. 21.

* cited by examiner

*Primary Examiner* — Leslie C Pascal
(74) *Attorney, Agent, or Firm* — The Webb Law Firm (57) ABSTRACT

An optical endless phase shifting device includes a Mach-Zehnder structure operated in push-pull configuration and that creates a differential phase shift. The first stage outputs combined signals which are phase shifted by a phase shift of zero or π in the second stage by phase shifters provided in both arms of the second stage or in a first arm only. These additionally phase-shifted signals are combined to at least one output signal. A control device controls the phase shifters such that endless shifting capability is provided by switching one of the phase shifters or the single phase shifter of the second stage to the respective other value when the differential phase shift reaches a given range of the differential phase shift of [0;π/2] in the configuration with two phase shifters in the second stage or [0;π/2] in the configuration with only one phase shifters in the second stage.

17 Claims, 4 Drawing Sheets

Fig. 3a
Fig. 3b
Fig. 3c
Fig. 3d

METHOD AND DEVICE FOR ENDLESS PHASE SHIFTING OF AN OPTICAL SIGNAL

CROSS-REFERENCE TO RELATED APPLICATION

This application claims priority to European Patent Application No. 19 194 610.2 filed Aug. 30, 2019, the disclosure of which is hereby incorporated by reference in its entirety.

BACKGROUND OF THE INVENTION

Field of the Invention

The invention relates to an optical endless phase shifting device configured to shift an optical input signal by a desired phase shift as well as to a method therefor.

Technical Considerations

The necessity of endless phase-shifting of an optical signal occurs in connection with various communication components, especially in connection with coherent detection. For coherent detection, the data signal received is superimposed with a local oscillator signal, for instance in an optical 3-dB coupler, and the combined signal is received on a photodiode. As compared to direct detection, coherent detection reveals an improved sensitivity for the detection of intensity-modulated optical signals. A drawback of coherent detection is the fact that the output electrical signal is also dependent on the phase difference between the optical signal to be received and the local oscillator signal with a sinusoidal function. If both even slightly differ in frequency, the electrical signal fades in and out with the combined frequency. One solution is the use of a phase diversity receiver, e.g. based on an optical hybrid. The drawback is the increased componentry, as the phase-diverse signals need to be received on multiple photodiodes and processed in parallel. It is therefore beneficial to directly control the phase of the local oscillator to match the phase of the data signal at the interference coupler (or have a fixed phase difference of $\pi/2$). This requires an optical phase shifter that can continuously rotate the phase of the local oscillator, even over many multiples of $\pi$, without the need to "reset" the phase, e.g. when the desired phase shift reaches a value equal to $2\pi$ or an integer multiple thereof.

Another problem with coherent detection is also the fact that ideally the optical signal to be detected and the local oscillator signal need to have the same polarization for optimum interference. Of course, polarization diversity detection would solve this problem but, as mentioned above, requires additional componentry and signal processing to separate the signal to be detected into two signals of orthogonal polarization and to further process these signals. In order to avoid polarization diversity detection, an optical circuit realizing an optical polarization controller is required to convert the optical signal to be detected that has an arbitrary polarization into an optical signal having a predefined polarization, e.g. corresponding to the polarization supported by a waveguide structure in silicon, which supports only one polarization. Also such optical polarization controllers require an endless and reset-less phase control.

A further application of an endless phase shifter is the stabilization of the phase of a laser. Supported by a PLL, comparing phase samples at different times, the endless phase shifter can be used to maintain a constant optical phase at the phase shifter output.

U.S. Pat. No. 8,787,708 B2 discloses an endless phase shifting apparatus, structures and method useful, for example, in multiple-input multiple-output optical demultiplexers. Here, a phase modulator can create a phase shift between 0 and 4 pi. A waveguide parallel to the phase modulator has a fixed phase delay of $2\pi$. Optical switches before and after the structure allow to switch the signal between the phase modulator and the parallel waveguide. When the modulator is at 0 or $4\pi$ phase shift, the signal is switched to the parallel waveguide and the phase modulator is reset to a phase shift of $2\pi$. Allegedly, this switching occurs without impact on the signal. However, simultaneously switching the optical switches before and after the phase modulator is a challenging task. Thus, the main drawbacks of this method and device for endless shifting an optical signal are that the phase modulator must provide a large phase shift range of $4\pi$ and that fast switches and a fast modulator phase reset are required.

An alternative endless phase shifter can be realized by an IQ-modulator structure, wherein in-phase and quadrature components are modulated, maintaining a constant amplitude and introducing a phase rotation. While this setup can continuously modulate the phase without fast switching or a fast phase reset, the intrinsic insertion loss is 6 dB, which in many cases cannot be tolerated.

It is thus an object of the present invention to provide an optical endless phase shifting device for phase shifting an optical input signal by a desired phase shift which reveals a lower intrinsic insertion loss and which does not require synchronous fast switching. It is a further object of the present invention to provide a method for realizing such an optical endless phase shifting device.

SUMMARY OF THE INVENTION

The invention achieves these objects with the combination of features as described herein.

According to the invention, the optical endless phase shifting device comprises a first and a second stage. The first stage comprises a Mach-Zehnder structure comprising a passive optical splitter device configured to receive, at an input port, an optical input signal ($E_{in}$) and to split the input signal into a first and a second partial signal, each of which is fed, from a dedicated output port of the splitter device, to a first and a second branch of the first stage that connects the respected output port of the splitter device to a dedicated input port of a passive optical combiner device, the combiner device being configured to output a first combined signal at a first output port and a second combined signal at a second output port, each of the first and second branches of the first stage comprising a controllable optical phase shifter, wherein the phase shifter in the first branch is configured to shift the phase of the first partial signal by a positive predetermined phase shift and wherein the phase shifter in the second branch is configured to shift the phase of the second partial signal by a negative predetermined phase shift. In other words, the first stage realizes a Mach-Zehnder interferometer with push-pull configuration using an optical 2×2-coupler for creating two optical signals that are fed to the second stage. The second stage comprises a passive optical combiner device having a first input port connecting a first branch of the second stage to the first output port of the first stage combiner device and a second input port connecting a second branch of the second stage to the second output port of the first stage combiner device, the first branch or the first and second branches of the second stage comprising a controllable optical phase shifter, the combiner device being configured to output, at at least one output port, an optical output signal, which corresponds to the optical input signal that is phase-shifted by the desired phase shift.

According to the invention, the optical phase shifters in the first branch or the first and second branches of the second stage are configured to be switchable between a first value of zero and a second value of $\pi$ for a phase shift created by the respective optical phase shifter. As apparent from the following description, the optical phase shifters in the first or the first and the second branches are switched, in order to provide the endless phase-shifting capability of the device, in a status in which the optical power of the signal in the respective branch is essentially zero. This mitigates the requirement of providing high-speed and high-precision switching.

In order to provide an endless phase shifting capability, the first stage optical phase shifters are controllable in such a way that that they create a predetermined phase shift having an absolute value within a range from 0 to $\pi/2$ in case an optical phase shifter is provided in both branches of the second stage, or that they create a predetermined phase shift having an absolute value within a range from 0 to $\pi$ in case an optical phase shifter is provided in only the first branch of the second stage.

That is, in embodiments that comprise a phase shifter in both branches of the second stage, the phase-shift range of the phase shifters of the first stage can be restricted to a small range from zero to $\pi/2$. The endless-shifting capability of the device is achieved by switching the two phase shifters of the second stage into an appropriate status of zero or $\pi$, respectively, when, depending on the desired (total) phase shift, the absolute value of predetermined phase shift that is to be realized by each of the two phase shifters of the first stage reaches the upper or lower boundary of the phase shift range from zero to $\pi/2$. As will become apparent from the description below, the neighboring status of the two switches of the second stage requires switching of only one of the phase shifters from zero to $\pi$ or from $\pi$ to zero, wherein the optical power of the signal present in the branch in which the phase shifter to be switched is provided is zero.

Generally the same applies to embodiments that comprise a phase shifter in the first branch of the second stage only. In this first branch, the optical signal is proportional to the sine of the (positive) phase shift (or phase angle) created by phase shifters comprised in the branches of the first stage. However, these embodiments require a larger phase shift range for the predetermined phase shift from zero to $\pi$.

According to an embodiment of the invention, the optical splitter device that is comprised by the first stage may be configured to output a first and a second optical output signal, wherein the electrical fields of the first and second optical output signals have essentially the same absolute value, but are shifted by $\pi/2$.

This property is in general fulfilled by an optical 1×2 coupler, e.g. an optical 1×2 fiber coupler or an optical integrated 1×2 coupler. In such optical couplers, the electrical field of the optical signal that is coupled from a pass-through path to the further output path is rotated by $\pi/2$.

According to an embodiment, the optical combiner devices of the first and or second stage may be configured to create the first combined signal ($E_{sin}$) by adding the electrical field of the optical signal that is fed to the first input port and the electrical field of the optical signal that is fed to the second input port shifted by $\pi/2$, and the second combined signal ($E_{cos}$) by adding the electrical field of the optical signal that is fed to the second input port and the electrical field of the optical signal that is fed to the first input port shifted by $\pi/2$.

Such an optical combiner device may be realized as an optical 1×2 coupler, e.g. an optical 1×2 fiber coupler or an optical integrated 1×2 coupler.

According to an embodiment, the first stage combiner device may be configured to create, at the first and second output port, the first and second combined signals ($E_{sin}$, $E_{cos}$) in such a way that they can be described by $$E_{sin} = j \cdot E_{in} \cdot \sin(\varphi) \text{ and}$$

$$E_{cos} = j \cdot E_{in} \cdot \cos(\varphi),$$

wherein $E_{in}$, $E_{sin}$ and $E_{cos}$ designate complex field amplitudes of the optical input signal ($E_{in}$), the first combined signal and the second combined signal, respectively, and $\varphi$ designates the predetermined phase shift. This can be achieved by using an optical 1×2-coupler as a splitter device and an optical 2×2-coupler as a combiner device in the first stage.

The second stage combiner device may be configured to create, at the at least one output port, the at least one optical output signal in such a way that it can be described by $$E_{out,1} = j \cdot \frac{E_{in}}{\sqrt{2}} [\cos(\varphi) \cdot e^{j\varphi 3} + j \cdot \sin(\varphi) \cdot e^{j\varphi 2}] \quad \text{(Alternative 1)}$$

or by $$E_{out,2} = [\cos(\varphi) \cdot e^{j\varphi 3} - j \cdot \sin(\varphi) \cdot e^{j\varphi 2}] \quad \text{(Alternative 2)}$$

wherein $E_{out,1}$ and $E_{out,2}$ designate the complex field amplitude of two alternatives of the optical output signal, wherein $\varphi2$ designates the predetermined phase shift of zero or $\pi$ created by a phase shifter provided in the first branch of the second stage and wherein $\varphi3$ designates the predetermined phase shift of zero or $\pi$ created by a phase shifter provided in the second branch of the second stage, and wherein the terms $e^{j\varphi3}$ can be set to 1 if no corresponding phase shifter is provided in the respective branch.

According to the invention, the endless phase shifting device may comprise a control device configured to receive a phase shift signal including the desired phase shift and to output control signals that are fed to the phase shifters of the first stage as well as one or two control signals that are fed to the one or two phase shifters of the second stage.

According to an embodiment of the invention, a phase shifter is provided in both branches of the second stage and the at least one optical output signal is created according to the above alternative 1. In this embodiment, the control device can be configured to create the control signals in such a way that the optical phase shifters in both branches of the second stage create a phase shift zero if the desired phase shift is within a range from zero to $\pi/2$ plus a positive integer times $2\pi$, that the optical phase shifter in the first branch of the second stage creates a phase shift zero and the optical phase shifter in the second branch of the second stage creates a phase shift $\pi$ if the desired phase shift is within a range from $\pi/2$ to $\pi$ plus a positive integer times $2\pi$, that the optical phase shifters in both branches of the second stage create a phase shift $\pi$ if the desired phase shift is within a range from $\pi$ to $3/2 \cdot \pi$ plus a positive integer times $2\pi$, and that the optical phase shifter in the first branch of the second stage creates a phase shift π and the optical phase shifter in the second branch of the second stage creates a phase shift zero if the desired phase shift is within a range from 3/2·π to 2π plus a positive integer times 2π.

According to another embodiment of the invention, a phase shifter is provided in both branches of the second stage and the at least one optical output signal is created according to the above alternative 2. In this embodiment, the control device can be configured create to the control signals in such a way that the optical phase shifter in the first branch of the second stage creates a phase shift π and the optical phase shifter in the second branch of the second stage creates a phase shift zero if the desired phase shift is within a range from zero to π/2 plus a positive integer times 2π, that the optical phase shifters in both branches of the second stage create a phase shift π if the desired phase shift is within a range from π/2 to π plus a positive integer times 2π, that the optical phase shifter in the first branch of the second stage creates a phase shift zero and the optical phase shifter in the second branch of the second stage creates a phase shift π if the desired phase shift is within a range from π to 3/2·π plus a positive integer times 2π, and that the optical phase shifters in both branches of the second stage create a phase shift zero if the desired phase shift is within a range from 3/2·π to 2π plus a positive integer times 2π.

In further embodiments, in which a phase shifter is provided in the first branch of the second stage only and the at least one optical output signal is created according to the above alternative 1, the control device can be configured to create the control signals in such a way that the optical phase shifter of the second stage creates a phase shift zero if the desired phase shift is within a range from zero to π plus a positive integer times 2π, and that the optical phase shifter of the second stage creates a phase shift π if the desired phase shift is within a range from π to 2π plus a positive integer times 2π.

In embodiments in which a phase shifter is provided in the first branch of the second stage only and the at least one optical output signal is created according to the above alternative 2, the control device can be configured to create the control signals in such a way that the optical phase shifter of the second stage creates a phase shift π if the desired phase shift is within a range from zero to π plus a positive integer times 2π, and that the optical phase shifter of the second stage creates a phase shift zero if the desired phase shift is within a range from π to 2π plus a positive integer times 2π.

According to an embodiment, the method for endless shifting of an optical input signal by a desired phase shift according to the invention comprises the steps of:

splitting the optical input signal ($S_{in}$) and phase shifting the split optical input signals by a predetermined positive and negative phase shift (+φ, −φ), respectively, wherein the absolute value (φ) of the predetermined phase shift lies within a range of zero and π/2;

creating a first combined optical signal ($S_{sin}$) by further phase shifting at least one of the phase-shifted signals and adding the further phase-shifted signals, wherein the further phase shift is chosen in such a way that the first combined signal ($S_{sin}$) is proportional to $E_{in} \cdot \sin(\varphi)$, wherein $E_{in}$ designates the complex amplitude of the electrical field of the optical input signal ($S_{in}$);

creating a second combined optical ($S_{cos}$) signal by further phase shifting at least one of the phase-shifted signals and adding the further phase-shifted signals, wherein the further phase shift is chosen in such a way that the second combined signal is proportional to $E_{in} \cdot \cos(\varphi)$;

phase-shifting the first combined optical signal ($S_{sin}$) by a selectable value for a first additional phase shift (φ2) of zero or π and phase-shifting the second combined optical signal by a selectable value for a second additional phase shift (φ3) of zero or π;

creating at least one optical output signal ($S_{out,1}$, $S_{out,2}$) by adding the first and second additionally phase-shifted combined signals, wherein the first and/or second combined signal reveal a phase relation or wherein the first and/or second combined signals are further phase-shifted in such a way that the complex amplitude of the electrical signal of the optical output signal ($S_{out,1}$, $S_{out,2}$) is proportional to $$[\cos(\varphi) \cdot e^{j\varphi 3} + j \cdot \sin(\varphi) \cdot e^{j\varphi 2}] \quad \text{(alternative 1)}$$

or $$[\cos(\varphi) \cdot e^{j\varphi 3} - j \cdot \sin(\varphi) \cdot e^{j\varphi 2}] \quad \text{(alternative 2)}$$

wherein j designates the imaginary unit; and selecting the first and second additional phase shift (φ2, φ3), depending on the desired phase shift ($\varphi_{tot}$) and the absolute value (φ) of the predetermined phase shift (+φ, −φ), if the at least one optical output signal ($S_{out,1}$, $S_{out,2}$) is created according to alternative 1, as follows:

selecting a value of zero for both additional phase shifts (φ2, φ3) if the desired phase shift ($\varphi_{tot}$) is within a range from zero to π/2 plus a positive integer times 2π;

selecting a value of zero for the first additional phase shift (φ2) and a value of π for the second additional phase shifts (φ3) if the desired phase shift ($\varphi_{tot}$) is within a range from π/2 to π plus a positive integer times 2π;

selecting a value of π for both additional phase shifts (φ2, φ3) if the desired phase shift ($\varphi_{tot}$) is within a range from π to 3/2·π plus a positive integer times 2π, and selecting a value of π for the first additional phase shifts (φ2) and a value of zero for the second additional phase shifts (φ3) if the desired phase shift ($\varphi_{tot}$) is within a range from 3/2·π to 2π plus a positive integer times 2π; or selecting the first and second additional phase shift (φ2, φ3), depending on the desired phase shift ($\varphi_{tot}$) and the absolute value (φ) of the predetermined phase shift (+φ, −φ) if the at least one optical output signal ($S_{out,1}$, $S_{out,2}$) is created according to alternative 2, as follows:

selecting a value of π for the first additional phase shift (φ2) and a value of zero for the second additional phase shift (φ3) if the desired phase shift ($\varphi_{tot}$) is within a range from zero to π/2 plus a positive integer times 2π;

selecting a value of π for both additional phase shifts (φ2, φ3) if the desired phase shift ($\varphi_{tot}$) is within a range from π/2 to π plus a positive integer times 2π;

selecting a value of zero for the first additional phase shift (φ2) and a value of π for the second additional phase shifts (φ3) if the desired phase shift (φ$_{tot}$) is within a range from π to 3/2·π plus a positive integer times 2π, and selecting a value of zero for both additional phase shifts (φ2, φ3) if the desired phase shift (φ$_{tot}$) is within a range from 3/2·π to 2π plus a positive integer times 2π.

According to another embodiment, the method for endless shifting of an optical input signal by a desired phase shift according to the invention comprises the steps of:

splitting the optical input signal (S$_{in}$) and phase-shifting the split optical input signals by a predetermined positive and negative phase shift (+φ, −φ), respectively, wherein the absolute value (φ) of the predetermined phase shift lies within a range of zero and π/2;

creating a first combined optical signal (S$_{sin}$) by further phase-shifting at least one of the phase shifted signals and adding the further phase-shifted signals, wherein the further phase shift is chosen in such a way that the first combined signal (S$_{sin}$) is proportional to E$_{in}$·sin(φ), wherein E$_{in}$ designates the complex amplitude of the electrical field of the optical input signal (S$_{in}$);

creating a second combined optical signal (S$_{cos}$) by further phase-shifting at least one of the phase-shifted signals and adding the further phase-shifted signals, wherein the further phase shift is chosen in such a way that the second combined signal is proportional to E$_{in}$·cos(φ);

phase-shifting the first combined optical signal (S$_{sin}$) by a selectable value for an additional phase shift (φ2) of zero or π;

creating at least one optical output signal (S$_{out,1}$, S$_{out,2}$) by adding the first additionally phase-shifted combined signal and the second combined signal, wherein the first and/or second combined signals reveal a phase relation or wherein the first and/or second combined signals are further phase shifted in such a way that the complex amplitude of the electrical signal of the optical output signal (S$_{out,1}$, S$_{out,2}$) is proportional to

[cos(φ)+j·sin(φ)·e$^{jφ2}$]   (alternative 1)

or

[cos(φ)−j·sin(φ)·e$^{jφ2}$]   (alternative 2)

wherein j designates the imaginary unit; and selecting the additional phase shift (φ2), depending on the desired phase shift (φ$_{tot}$) and the absolute value (φ) of the predetermined phase shift (+φ, −φ) if the at least one optical output signal (S$_{out,1}$, S$_{out,2}$) is created according to alternative 1, as follows:

selecting a value of zero for the additional phase shift (φ2) if the desired phase shift (φ$_{tot}$) is within a range from zero to π plus a positive integer times 2π;

selecting a value of π for the additional phase shift (φ2) if the desired phase shift (φ$_{tot}$) is within a range from π to 2·π plus a positive integer times 2π, or selecting the additional phase shift (φ2), depending on the desired phase shift (φ$_{tot}$) and the absolute value (φ) of the predetermined phase shift (+φ, −φ) if the at least one optical output signal (S$_{out,1}$, S$_{out,2}$) is created according to alternative 2, as follows:

selecting a value of π for the additional phase shift (φ2) if the desired phase shift (φ$_{tot}$) is within a range from zero to π plus a positive integer times 2π;

selecting a value of zero for the additional phase shift (φ2) if the desired phase shift (φ$_{tot}$) is within a range from π to 2·π plus a positive integer times 2π.

BRIEF DESCRIPTION OF THE DRAWINGS

These and other features and objects of the present invention will become more fully apparent from the following description of specific embodiments thereof which are illustrated in the drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
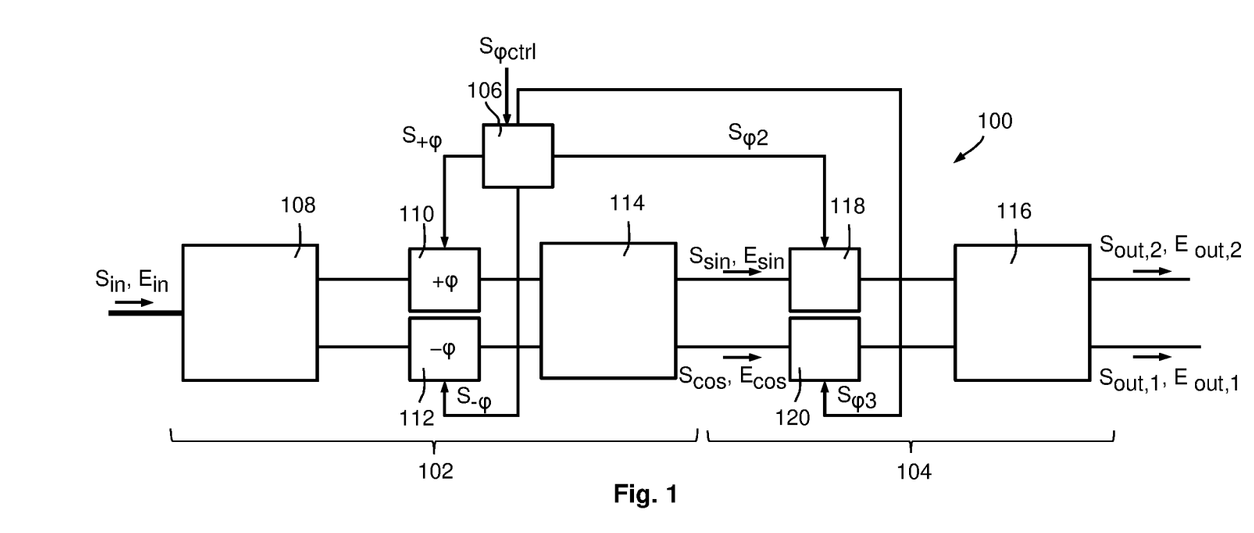
FIG. 1 shows a schematic block diagram of a first embodiment of an optical endless phase shifting device according to the present invention comprising optical phase shifters in both branches of the second stage.

FIG. 1 shows a schematic block diagram of a first embodiment of an optical endless phase shifting device 100 comprising a first stage 102 and a second stage 104. Both stages are controlled by a control device 106.

The first stage comprises a Mach-Zehnder interferometer structure that is operated in push-pull configuration and that comprises a passive 1×2 optical splitter device 108, two controllable optical phase shifters 110, 112 and a passive 2×2 optical combiner device 114. The two controllable optical phase shifters 110, 112 are provided in a first and second branch of the first stage, wherein the first branch extends between a first splitting port of the passive optical splitter device 108 and a first input port of the passive optical combiner device 114, and the second branch extends between a second splitting port of the passive optical splitter device 108 and a second input port of the passive optical combiner device 114.

The passive 1×2 optical splitter device 108 may be realized as a passive optical 1×2 fiber coupler or any other type of passive optical 1×2 coupler, e.g. an integrated waveguide coupler. Likewise, the passive 2×2 optical combiner device 114 may be realized as a passive optical 2×2 fiber coupler or any other type of passive optical 2×2 coupler, e.g. an integrated waveguide coupler. Each of the two controllable phase shifters, which may be realized in any arbitrary way, is configured to create a predetermined phase shift between an optical input signal received at an input port and an optical output signal output at an output port depending on a control signal $S_{+\varphi}$, $S_{-\varphi}$, e.g. a voltage, that is fed to a respective control port. Generally, the phase shifters 110, 112 are configured and controlled, by the control device 106, in such a way that a positive predetermined phase shift $+\varphi$ is created by the phase shifter 110 and a negative predetermined phase shift $-\varphi$ is created by the phase shifter 112. In case of the embodiment according to FIG. 1, the phase shifters 110, 112 and the control device 106 are configured to create a positive and negative phase shift with an absolute value of $\varphi$ in the range of $[0; \pi/2]$ depending on the respective control signal $S_{+\varphi}$, $S_{-\varphi}$ that is supplied to the corresponding optical phase shifter device 110, 112 by the control device 106. In the following, the absolute value of the predetermined phase shift $-\varphi$, $+\varphi$ is also referred to as differential phase shift.

The second stage comprises a further passive optical 2×2 combiner device 116 and two further controllable optical phase shifters 118, 120. The two further controllable optical phase shifters 118, 120 are provided in a first and second branch of the second stage, wherein the first branch extends between a first output port of the passive optical combiner device 114 of the first stage and a first input port of the passive optical combiner device 116, and the second branch extends between a second output port of the passive optical combiner device 114 of the first stage and a second input port of the passive optical combiner device 116. Each of the phase shifters 118, 120 is configured to create an additional phase shift $\varphi2$, $\varphi3$ of zero or $\pi$ between an input signal received at an input port and an output signal output at an output port, depending on a respective control signal $S_{\varphi2}$, $S_{\varphi3}$ that is created by the control device 106.

It shall be noted that the whole optical endless phase shifting device 100 may be realized as a photonic integrated circuit (PIC).

In the following, the function of the endless phase shifting device 100 will be explained in detail.

An optical input signal $S_{in}$, e.g. the optical signal created by a local oscillator of a coherent optical receiver, which is characterized by a complex amplitude $E_{in}$, is fed to an input port of the passive optical splitter device 108. The endless phase shifting device 100 creates at least one optical output signal $S_{out,1}$, $S_{out,2}$, which is output at a respective output port of the passive optical combiner device 116 of the second stage 104, wherein the at least one output signal $S_{out,1}$, $S_{out,2}$ corresponds to the optical input signal $S_{in}$ but is phase-shifted by a predetermined total phase shift $\varphi_{tot}$. In the following, the total phase shift $\varphi_{tot}$ is also referred to as "desired phase shift".

The passive optical 1×2 splitter device 108, which is preferably a 3 dB splitter device, splits the input signal an into two signals that are phase-shifted between each other by $\pi/2$ due to an inherent property of the passive optical splitter device 108. These signals are then shifted, by the respective optical phase shifter 110, 112, by a phase shift of $+\varphi$ and $-\varphi$, respectively. These phase-shifted signals are then combined, by the passive optical 2×2 combiner device 114, which is preferably realized as a 3 dB 2×2 combiner device, into two combined signals $S_{sin}$ and $S_{cos}$ (each represented by the complex amplitude of the electric field $E_{sin}$ and $E_{cos}$). The combiner device 114 also adds an additional phase shift of $\pi/2$ to one of the two components that are added to yield the signals $S_{sin}$ and $S_{cos}$. It can be shown that the following equations describe the signals $S_{sin}$ and $S_{cos}$:

$$E_{sin} = j \cdot E_{in} \cdot \sin(\varphi) \qquad \text{(Eq. 1)}$$

$$E_{cos} = j \cdot E_{in} \cdot \cos(\varphi) \qquad \text{(Eq. 2)}$$

Obviously, these signals are proportional to the cosine and the sine of the differential phase shift, respectively.

Figure 2A:
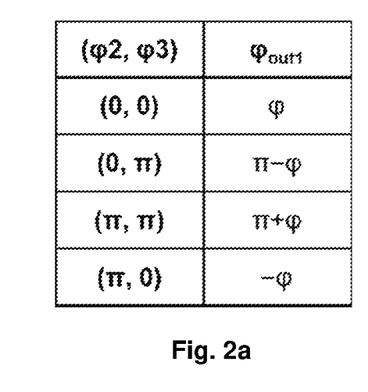
FIGS. 2a-2b show tables including values of the phase shifts created by the optical phase shifters and the values for the resulting phase shift of the phase-shifted optical output signals of the second stage of the embodiment according to FIG. 1.

In the second stage, the signals $S_{sin}$ and $S_{cos}$ are phase-shifted, by the respective optical phase shifter 118, 120, by a selectable phase shift of zero or $\pi$, respectively, and combined, by the passive optical combiner device 116, into the at least one output signal $S_{out,1}$, $S_{out,2}$, wherein the combiner device 116 adds an additional phase shift of $\pi/2$ to one of the two components that are added to yield the at least one output signal $S_{out,1}$, $S_{out,2}$. In the embodiment of FIG. 1, two output signals $S_{out,1}$, $S_{out,2}$ are created by the 2×2 combiner device 116, which is used in the second stage. It is, however, also possible to use a 2×1 combiner device in the second stage so that only a single output signal (i.e. either $S_{out,1}$ or $S_{out,2}$) is created. Using equations 1 and 2, the complex electrical field amplitudes $E_{out,1}$, $E_{out,2}$ of the optical output signals $S_{out,1}$, $S_{out,2}$ can be calculated by $$E_{out,1} = j \cdot \frac{E_{sin}}{\sqrt{2}} \cdot e^{j\varphi 2} + \frac{E_{cos}}{\sqrt{2}} \cdot e^{j\varphi 3} = \qquad \text{(Eq. 3)}$$
$$j \cdot \frac{E_{in}}{\sqrt{2}} [\cos(\varphi) \cdot e^{j\varphi 3} + j \cdot \sin(\varphi) \cdot e^{j\varphi 2}]$$

$$E_{out,2} = \qquad \text{(Eq. 4)}$$
$$\frac{E_{sin}}{\sqrt{2}} \cdot e^{j\varphi 2} + j \cdot \frac{E_{cos}}{\sqrt{2}} \cdot e^{j\varphi 3} = -\frac{E_{in}}{\sqrt{2}} [\cos(\varphi) \cdot e^{j\varphi 3} - j \cdot \sin(\varphi) \cdot e^{j\varphi 2}]$$

wherein the phase shifts $\varphi2$ and $\varphi3$ are the phase shifts of zero or $\pi$ created by the optical phase shifters 118 and 120 in the first arm (carrying the signal $E_{sin}$) and second arm (carrying the signal $E_{cos}$) of the second stage, respectively. The total phase shift $\varphi_{tot}$ of the output signals $S_{out,1}$ and $S_{out,2}$ can be calculated as $$E_{out,1} = j \cdot \frac{E_{in}}{\sqrt{2}} [\cos(\varphi) \cdot e^{j\varphi 3} + j \cdot \sin(\varphi) \cdot e^{j\varphi 2}] = j \cdot \frac{E_{in}}{\sqrt{2}} \cdot e^{j\varphi out,1} \qquad \text{(Eq. 5)}$$

$$E_{out,2} = -\frac{E_{in}}{\sqrt{2}} [\cos(\varphi) \cdot e^{j\varphi 3} - j \cdot \sin(\varphi) \cdot e^{j\varphi 2}] = -\frac{E_{in}}{\sqrt{2}} \cdot e^{j\varphi out,2} \qquad \text{(Eq. 6)}$$

wherein $\varphi$out,1 designates the total phase shift $\varphi_{tot}$ of the output signals $S_{out,1}$ and $S_{out,2}$ designates the total phase shift $\varphi_{tot}$ of the output signals $S_{out,2}$. The table in FIG. 2a shows the values for the total phase shift $\varphi$out,1 for all possible combinations of the phase shifts created by the phase shifters 118, 120 in the second stage 104. If both phase shifts $\varphi2$, $\varphi3$ are zero, the total phase shift $\varphi$out,1 equals the differential phase shift $\varphi$, i.e. the total phase shift $\varphi$out,1 varies from zero to $\pi/2$ if the differential phase shift is varied from zero to $\pi/2$. When the total phase shift $\varphi$out,1 reaches $\pi/2$, the phase shift $\varphi3$ is switched to $\pi$. Thus, reducing the differential phase shift from $\pi/2$ to zero leads to a further increase in the total phase shift $\varphi$out,1, as now the total phase shift $\varphi$out,1 equals $(\pi-\varphi)$. When the differential phase shift reaches zero, the phase shift $\varphi2$ is switched to $\pi$ (while $\varphi3$ is kept at $\pi$). Thus, if the differential phase shift $\varphi$ is again increased from zero to $\pi/2$, the total phase shift $\varphi$out,1 further increases from π to 3/2·π, as now the total phase shift φout,1 equals (π+φ). When the differential phase reaches π/2, the phase shift φ3 is switched to zero (while φ2 is kept at π). Therefore, a decrease in the differential phase shift from π/2 to zero again leads to a further increase in the total phase shift φout,1, now the total phase shift φout,1 equals (2π−φ), which is identical to −φ. If the differential phase φ is again increased from zero to π/2, i.e. the total phase shift equals 2π+φ, the phase shift φ2 is switched to zero (while φ3 is kept at zero) and the cycle is repeated from the beginning. That is, the values for the total phase shift φout,1 in the now beginning cycle can be calculated by the values given in the table in FIG. 2a plus 2π (in general, for each additional cycle 2π must be added to the values for φout,1 given in the table according to FIG. 2a). In this way an endless shift of the total phase shift φout,1 can be realized by appropriately switching the values of the phase shift φ2 and φ3 from zero to π or vice versa at the borders of the range of [0;π/2] for the differential phase shift φ.

Of course, the value of the differential phase shift φ instead of the value of the total phase shift φout,1 or φout,2 can be used in order to determine when a switching operation of the phase shifters 118, 120 is required.

As the switching of the additional phase shifts φ2 and φ3 is carried out in a state when the power in the respective branch of the second stage 104 is (nearly) zero, a phase shift in this branch between zero and π can be created without disturbing the optical signal.

The control device 106 may be configured to create the control signals $S_{φ2}$, $S_{φ3}$ depending on the values of the differential phase shift φ, i.e. at a time when the differential phase shift φ reaches the upper or lower limit value of the range for the differential phase shift φ, the control signals $S_{φ2}$, $S_{φ3}$ comprise features (e.g. a rising or falling edge) that trigger a switching operation of one of the phase shifters 118, 120.

The control device may be configured to receive a phase control signal $S_{φctrl}$ comprising information concerning a value for the total phase shift $φ_{tot}$ (i.e. for the phase shifts φout,1 and/or φout,2 of the optical output signals $S_{out,1}$ and/or $S_{outt,2}$, respectively). Theoretically, if the value for the total phase shift $φ_{tot}$ is larger than 2π, the control device may start at an arbitrary value smaller than 2π and increase the total phase shift (by appropriately increasing the differential phase shift φ and performing the switching operations of the phase shifters 118, 120) until the desired total phase shift $φ_{tot}$ is reached. However, as in most applications the optical input signal is a narrow band signal (e.g. a CW laser signal), a start value for the total phase will generally be chosen in such a way that it lies within [0;2π] as any higher value that is equal to such a start value plus an integer value times 2π will lead to the same result due to the periodicity of the optical input signal $S_{in}$.

Figures 3A, 3B:
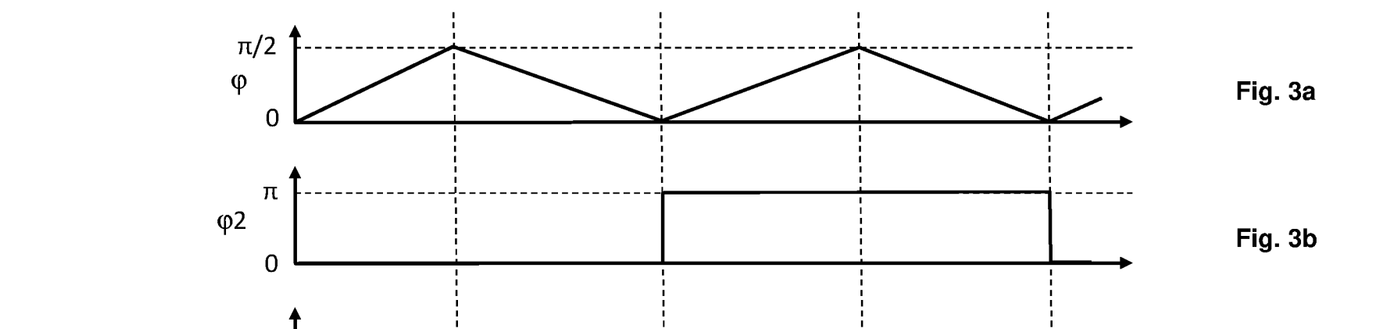
FIGS. 3a-3d show, for the embodiment according to FIG. 1, diagrams comprising curves for the phase shift φ created by the optical phase shifters of the first stage (FIG. 3a), for the phase shifts φ2, φ3 created by the optical phase shifters of the first and second branch of the second stage (FIGS. 3b, 3c) and for the total phase shift of the phase-shifted optical output signals of the second stage (FIG. 3d)
Figure 3C:
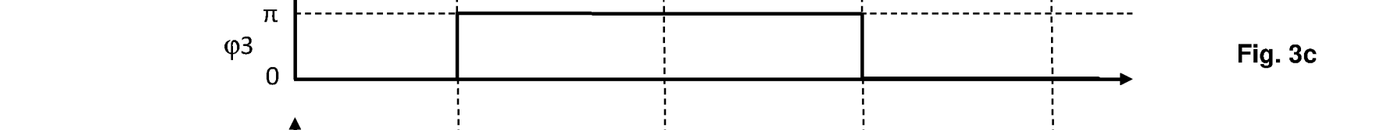
Figure 3D:
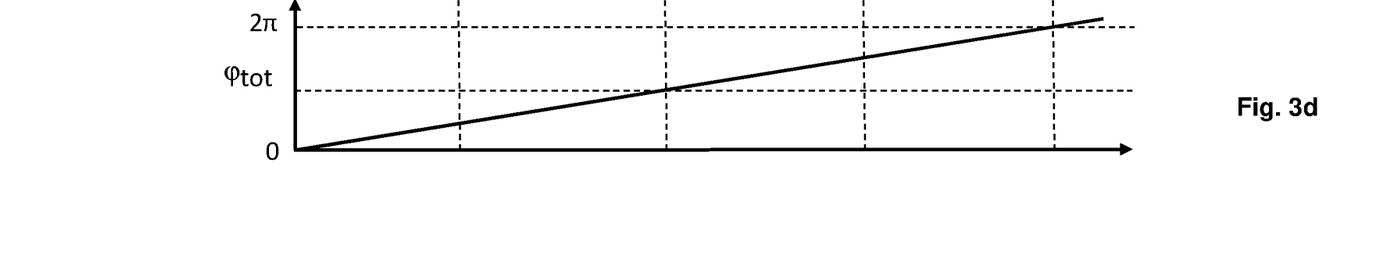

FIGS. 3a-3d show diagrams comprising curves illustrating the functionality explained above. The horizontal axes may be interpreted as time axes. The curve in FIG. 3a shows alternating increases and decreases in the differential phase φ from zero to π/2 and π/2 to zero, respectively. FIGS. 3b and 3c show the values of the additional phase shifts φ2 and φ3 and FIG. 3d shows the steady increase in the total phase φout,1.

Figure 2B:
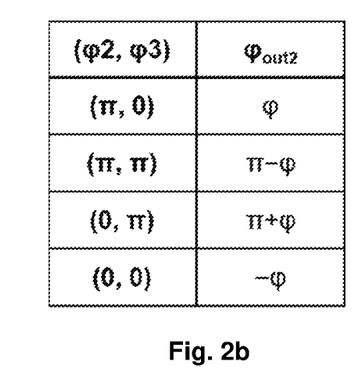

The table in FIG. 2b shows the corresponding values for the additional phase shifts φ2 and φ3 and the total phase shift φout,2. Again, the four quadrants of a total phase shift of 2π for the output signal $S_{out,2}$ can be realized by starting with φ2=π, φ3=0 in the first quadrant, in which 0≤φ≤π/2, switching to φ2=π, φ3=π when φ=π/2 and keeping these values of φ2, φ3 in the second quadrant, in which π/2≤φ≤π, switching to φ2=0, φ3=π when φ=π and keeping these values of φ2, φ3 in the third quadrant, in which π≤φ≤3/2·π, and switching to φ2=0, φ3=0 when φ=3/2·π and keeping these values of φ2, φ3 in the fourth quadrant, in which 3/2·π≤φ≤2π, and so on in the following cycles.

Figure 4:
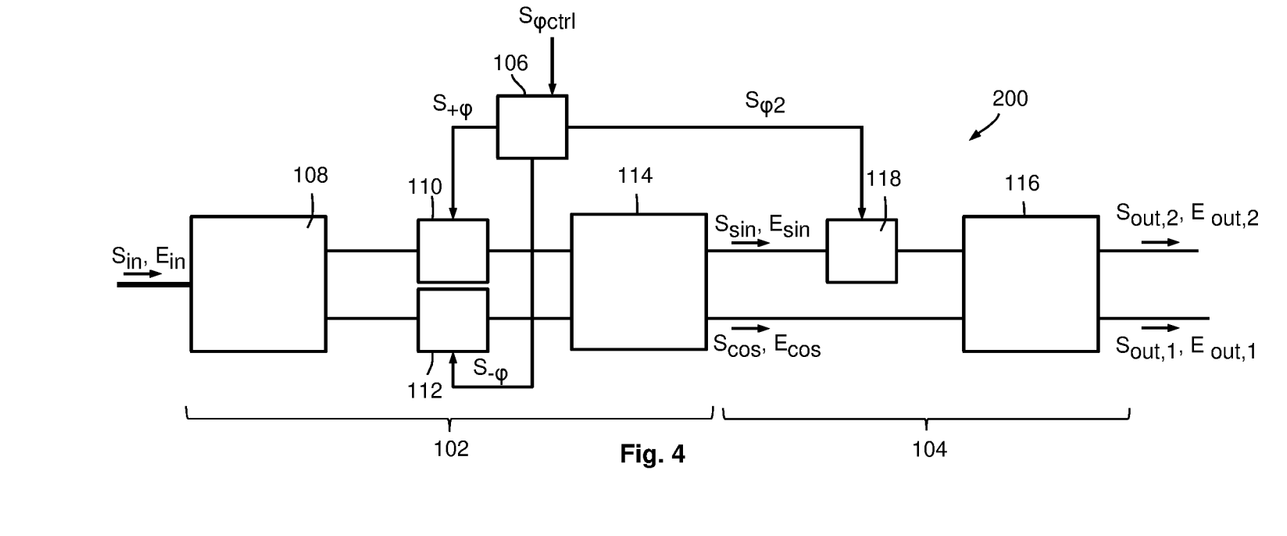
FIG. 4 shows a schematic block diagram of a second embodiment of an optical endless phase shifting device according to the present invention comprising optical phase shifters in the first branch of the second stage only.

FIG. 4 shows another embodiment 200 of an optical endless phase shifting device which differs from the embodiment 100 according to FIG. 1 only in that no optical phase shifter is provided in the second branch of the second stage 104. That is, the equations 1 to 6 may be used to describe the respective signals if the phase shift φ3 is set to zero. As only two states are possible by switching the single optical phase shifter 118 between zero and π, the full range from zero to 2π can be divided in only two sections, namely, from zero to π and from π to 2π, and thus a phase shift range for the differential phase shift φ of [0;π] is required for the optical phase shifters 110, 112. Apart from these differences, the optical endless phase shifting device 200 generally works in the same way as the optical endless phase shifting device 100 shown in FIG. 1.

The switching actions required to obtain an endless phase shifting are carried out or initiated by the control device 106 in such a way that the control device 106 creates a control signal $S_{φ2}$ that is appropriate to switch the phase shift created by the phase shifter 118 from zero to π when the differential phase φ reaches π, and the control device 106 creates a control signal $S_{φ2}$ that is appropriate to switch the phase shift created by the phase shifter 118 from π to zero when the differential phase φ reaches zero.

Figure 5A:
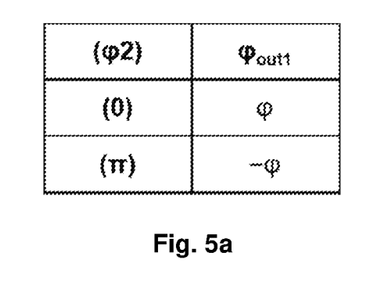
FIGS. 5a-5b show tables including values of the phase shifts created by the optical phase shifter and the values for the resulting phase shift of the phase-shifted optical output signals of the second stage of the embodiment according to FIG. 4.
Figure 5B:
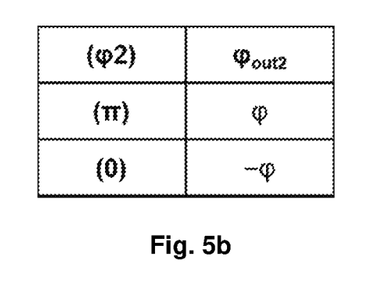

As shown in the tables according to FIGS. 5a-5b, the total phase shift φout,1 is equal to the differential phase shift φ (plus an integer value times 2π) if the phase shifter 118 creates a phase shift of φ2=0 and equal to 2π minus the differential phase shift φ (i.e. equal to −φ) (plus an integer value times 2π) if the phase shifter 118 creates a phase shift of φ2=π (FIG. 5a). The total phase shift φout,2 is equal to the differential phase shift φ (plus an integer value times 2π) if the phase shifter 118 creates a phase shift of φ2=π and equal to 2π minus the differential phase shift φ (i.e. equal to −φ) (plus an integer value times 2π) if the phase shifter 118 creates a phase shift of φ2=0 (FIG. 5b).

Figure 6A:
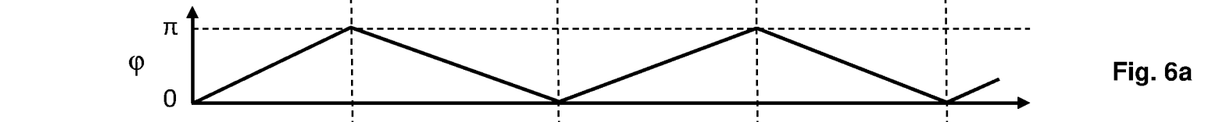
FIGS. 6a-6c show, for the embodiment according to FIG. 1, diagrams comprising curves for the phase shift φ created by the optical phase shifters of the first stage (FIG. 6a), for the phase shift φ2 created by the optical phase shifter of the first branch of the second stage (FIG. 6b) and for the total phase shift φ$_{tot}$ of the phase-shifted optical output signals of the second stage (FIG. 6c).
Figure 6B:
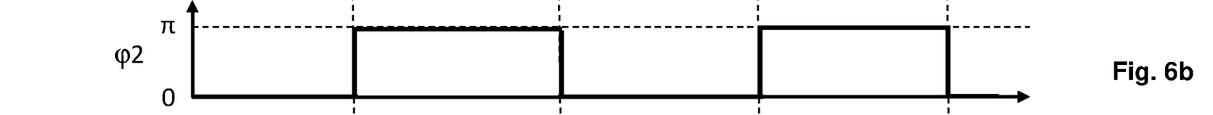
Figure 6C:
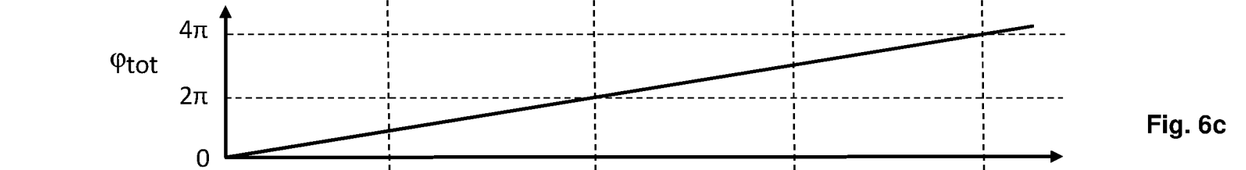

FIGS. 6a-6c show diagrams comprising curves illustrating the endless phase switching capability of the optical endless phase switching device 200 explained above. The horizontal axes may be interpreted as time axes. The curve in FIG. 6a shows alternating increases and decreases in the differential phase φ from zero to π and π to zero, respectively. FIG. 6b shows the values of the additional phase shift φ2 and FIG. 6c shows the steady increase in the total phase φout,1.

All embodiments 100, 200 of the invention provide an endless switching capability wherein the switching operations are performed at times at which the optical power of the optical signal that is supplied to the input port of the respective optical phase shifter is essentially zero or at least very low so that essentially no signal distortions occur. Only a single switching operation must be performed at a time so that no synchronization of two or more phase shifters is required.

LIST OF REFERENCE SIGNS 100 optical endless phase shifting device
102 first stage
104 second stage
106 control device 108 passive optical splitter device
110 optical phase shifter
112 optical phase shifter
114 passive optical combiner device
116 passive optical combiner device
118 optical phase shifter
120 optical phase shifter
φ differential phase shift/predetermined phase shift
+φ FT phase shift
−φ phase shift
φ2 additional phase shift
φ3 additional phase shift
$φ_{tot}$ total phase shift/desired phase shift
$E_{in}$ complex amplitude of the electrical field of $S_{in}$
$E_{sin}$ complex amplitude of the electrical field of $S_{sin}$
$E_{cos}$ complex amplitude of the electrical field of $S_{cos}$
$S_{+φ}$ control signal
$S_{−φ}$ control signal
$S_{φ2}$ control signal
$S_{φ3}$ control signal
$S_{in}$ optical input signal $S_{in}$
$S_{out,1}$ optical output signal
$S_{out,2}$ optical output signal
$S_{sin}$ combined signal
$S_{cos}$ combined signal
$S_{φctrl}$ control signal

The invention claimed is:

1. An optical endless phase shifting device for shifting an optical input signal by a desired phase shift comprising a first and a second stage,
(a) the first stage comprising a Mach-Zehnder structure comprising a passive optical splitter device configured to receive, at an input port, an optical input signal ($S_{in}$) and to split the input signal into a first and a second partial signal, each of which is fed, from a dedicated output port of the splitter device, to a first and a second branch of the first stage that connects the respective output port of the splitter device to a dedicated input port of a passive optical combiner device, the combiner device being configured to output a first combined signal ($S_{sin}$) at a first output port and a second combined signal ($S_{sin}$) at a second output port, each of the first and second branches of the first stage comprising a controllable optical phase shifter, wherein the phase shifter in the first branch is configured to shift the phase of the first partial signal by a positive predetermined phase shift (+φ) and wherein the phase shifter in the second branch is configured to shift the phase of the second partial signal by a negative predetermined phase shift (−φ), and
(b) the second stage comprising a passive optical combiner device having a first input port connecting a first branch of the second stage to the first output port of the first stage combiner device and a second input port connecting a second branch of the second stage to the second output port of the first stage combiner device, the first branch or the first and second branches of the second stage comprising a controllable optical phase shifter, the combiner device being configured to output, at at least one output port, an optical output signal ($S_{out,1}$, $S_{out,2}$), which corresponds to the optical input signal ($S_{in}$) that is phase shifted by a desired phase shift ($φ_{tot}$),
(c) wherein the optical phase shifters in the first branch or the first and second branches of the second stage are configured to be switchable between a first value of zero and a second value of π for a phase shift created by the respective optical phase shifter, and
(d) wherein the first stage optical phase shifters are controllable in such a way
(i) that they create a predetermined phase shift (+φ, −φ) having an absolute value within a range from 0 to π/2 in case an optical phase shifter is provided in both branches of the second stage, or
(ii) that they create a predetermined phase shift (+φ, −φ) having an absolute value within a range from 0 to π in case an optical phase shifter is provided in only the first branch of the second stage.

2. The optical endless phase shifting device according to claim 1, wherein the optical splitter device is configured to output a first and a second optical output signal, wherein the electrical fields of the first and second optical output signals have essentially the same absolute value but are phase shifted by π/2.

3. The optical endless phase shifting device according to claim 2, wherein the optical splitter device is an optical 1×2 coupler.

4. The optical endless phase shifting device according to claim 3, wherein the optical 1×2 coupler comprises an optical 1×2 fiber coupler or an optical integrated 1×2 coupler.

5. The optical endless phase shifting device according to claim 1, wherein the optical combiner device of the first stage is configured to create:
(a) the first combined signal ($S_{sin}$) by adding the electrical field of the optical signal that is fed to the first input port and the electrical field of the optical signal that is fed to the second input port shifted by π/2, and
(b) the second combined signal ($S_{cos}$) by adding the electrical field of the optical signal that is fed to the second input port and the electrical field of the optical signal that is fed to the first input port phase-shifted by π/2.

6. The optical endless phase shifting device according to claim 5, wherein the optical combiner device is an optical 1×2 coupler.

7. The optical endless phase shifting device according to claim 6, wherein the optical 1×2 coupler comprises an optical 1×2 fiber coupler or an optical integrated 1×2 coupler.

8. The optical endless phase shifting device according to claim 1, wherein the optical combiner device of the second stage is configured to create the at least one output signal ($S_{out,1}$, $S_{out,2}$)
(a) by adding the electrical field of the optical signal that is fed to the first input port and the electrical field of the optical signal that is fed to the second input port phase-shifted by π/2, and/or
(b) by adding the electrical field of the optical signal that is fed to the second input port and the electrical field of the optical signal that is fed to the first input port shifted by π/2.

9. The optical endless phase shifting device according to claim 1, wherein the first stage combiner device is configured to create, at the first and second output port, the first and second combined signals ($S_{sin}$, $S_{cos}$) in such a way that they can be described by $$E_{sin} = j \cdot E_{in} \cdot \sin(φ) \text{ and}$$

$$E_{cos} = j \cdot E_{in} \cdot \cos(φ)$$

wherein $E_{in}$, $E_{sin}$ and $E_{cos}$ designate complex field amplitudes of the optical input signal ($S_{in}$), the first combined signal and the second combined signal ($S_{sin}$, $S_{cos}$), respectively, and φ designates the absolute value of the predetermined phase shift.

10. The optical endless phase shifting device according to claim 9, wherein the second stage combiner device is configured to create, at the at least one output port, the at least one optical output signal ($S_{out,1}$, $S_{out,2}$) in such a way that it can be described by:

$$E_{out,1} = j \cdot \frac{E_{in}}{\sqrt{2}} [\cos(\varphi) \cdot e^{j\varphi 3} + j \cdot \sin(\varphi) \cdot e^{j\varphi 2}] \quad (a)$$

or by $$E_{out,2} = [\cos(\varphi) \cdot e^{j\varphi 3} - j \cdot \sin(\varphi) \cdot e^{j\varphi 2}] \quad (b)$$

wherein $E_{out,1}$ and $E_{out,2}$ designate the complex field amplitude of two alternatives of the optical output signal ($S_{out,1}$, $S_{out,2}$), wherein φ2 designates the phase shift of zero or π created by a phase shifter provided in the first branch of the second stage and wherein φ3 designates the phase shift of zero or π created by a phase shifter provided in the second branch of the second stage, and wherein the term $e^{j\varphi 3}$ can be set to 1 if no phase shifter is provided in the second branch.

11. The optical endless phase shifting device according to claim 1, comprising a control device configured to receive a phase control signal ($S_{\varphi ctrl}$) including information on the desired phase shift or a change thereof and to output control signals ($S_{-\varphi}$, $S_{+\varphi}$) that are fed to the phase shifters of the first stage as well as one or two control signals ($S_{\varphi 2}$, $S_{\varphi 3}$) that are fed to the one or two phase shifters of the second stage.

12. The optical endless phase shifting device according to claim 11, wherein a phase shifter is provided in both branches of the second stage,
the at least one optical output signal ($S_{out,1}$) is described by:

$$E_{out,1} = j \cdot \frac{E_{in}}{\sqrt{2}} [\cos(\varphi) \cdot e^{j\varphi 3} + j \cdot \sin(\varphi) \cdot e^{j\varphi 2}],$$

wherein $E_{out,1}$ designates the complex field amplitude of the optical output signal ($S_{out,1}$), wherein φ2 designates the phase shift of zero or π created by a phase shifter provided in the first branch of the second stage and wherein φ3 designates the phase shift of zero or π created by a phase shifter provided in the second branch of the second stage, and wherein the term $e^{j\varphi 3}$ can be set to 1 if no phase shifter is provided in the second branch,
the control device is configured to create the control signals ($S_{\varphi 2}$, $S_{\varphi 3}$) in such a way:
(a) that the optical phase shifters in both branches of the second stage create a phase shift zero if the desired phase shift ($\varphi_{tot}$) is within a range from zero to π/2 plus a positive integer times 2π,
(b) that the optical phase shifter in the first branch of the second stage creates a phase shift zero and the optical phase shifter in the second branch of the second stage creates a phase shift π if the desired phase shift ($\varphi_{tot}$) is within a range from π/2 to π plus a positive integer times 2π,
(c) that the optical phase shifters in both branches of the second stage create a phase shift π if the desired phase shift ($\varphi_{tot}$) is within a range from π to 3/2·π plus a positive integer times 2π, and
(d) that the optical phase shifter in the first branch of the second stage creates a phase shift π and the optical phase shifter in the second branch of the second stage creates a phase shift zero if the desired phase shift ($\varphi_{tot}$) is within a range from 3/2·π to 2π plus a positive integer times 2π.

13. The optical endless phase shifting device according to claim 12, wherein a phase shifter is provided in both branches of the second stage, that the at least one optical output signal ($S_{out,2}$) is described by:
$E_{out,2}=[\cos(\varphi) \cdot e^{j\varphi 3} - j \cdot \sin(\varphi) \cdot e^{j\varphi 2}]$, wherein $E_{out,2}$ designates the complex field amplitude of the optical output signal ($S_{out,2}$),
the control device is configured create to the control signals ($S_{\varphi 2}$, $S_{\varphi 3}$) in such a way:
(a) that the optical phase shifter in the first branch of the second stage creates a phase shift π and the optical phase shifter in the second branch of the second stage creates a phase shift zero if the desired phase shift ($\varphi_{tot}$) is within a range from zero to π/2 plus a positive integer times 2π,
(b) that the optical phase shifters in both branches of the second stage create a phase shift π if the desired phase shift ($\varphi_{tot}$) is within a range from π/2 to π plus a positive integer times 2π,
(c) that the optical phase shifter in the first branch of the second stage creates a phase shift zero and the optical phase shifter in the second branch of the second stage creates a phase shift π if the desired phase shift ($\varphi_{tot}$) is within a range from π to 3/2·π plus a positive integer times 2π, and
(d) that the optical phase shifters in both branches of the second stage create a phase shift zero if the desired phase shift ($\varphi_{tot}$) is within a range from 3/2·π to 2π plus a positive integer times 2π.

14. The optical endless phase shifting device according to claim 12, wherein a phase shifter is provided in the first branch of the second stage only, that the at least one optical output signal ($S_{out,1}$) is described by:

$$E_{out,1} = j \cdot \frac{E_{in}}{\sqrt{2}} [\cos(\varphi) \cdot e^{j\varphi 3} + j \cdot \sin(\varphi) \cdot e^{j\varphi 2}]$$

and that the control device is configured to create the control signal ($S_{\varphi,2}$) in such a way:
(a) that the optical phase shifter of the second stage creates a phase shift zero if the desired phase shift ($\varphi_{tot}$) is within a range from zero to π plus a positive integer times 2π, and
(b) that the optical phase shifter of the second stage creates a phase shift π if the desired phase shift ($\varphi_{tot}$) is within a range from π to 2π plus a positive integer times 2π.

15. The optical endless phase shifting device according to claim 12, wherein a phase shifter is provided in the first branch of the second stage only, that the at least one optical output signal ($S_{out,2}$) is described by:
$E_{out,2}=[\cos(\varphi) \cdot e^{j\varphi 3} - j \cdot \sin(\varphi) \cdot e^{j\varphi 2}]$, and that the control device is configured to create the control signal ($S_{\varphi,2}$) in such a way:
(a) that the optical phase shifter of the second stage creates a phase shift π if the desired phase shift ($\varphi_{tot}$) is within a range from zero to π plus a positive integer times 2π, and (b) that the optical phase shifter of the second stage creates a phase shift zero if the desired phase shift ($\varphi_{tot}$) is within a range from $\pi$ to $2\pi$ plus a positive integer times $2\pi$.

16. A method for endless shifting of an optical input signal by a desired phase shift:
    (a) splitting the optical input signal ($S_{in}$) and phase shifting the split optical input signals by a predetermined positive and negative phase shift (+$\varphi$, -$\varphi$), respectively, wherein the absolute value ($\varphi$) of the predetermined phase shift lies within a range of zero and $\pi/2$;
    (b) creating a first combined optical signal ($S_{sin}$) by further phase shifting at least one of the phase-shifted signals and adding the further phase-shifted signals, wherein the further phase shift is chosen in such a way that the first combined signal ($S_{sin}$) is proportional to $E_{in}\cdot\sin(\varphi)$, wherein $E_{in}$ designates the complex amplitude of the electrical field of the optical input signal ($S_{in}$);
    (c) creating a second combined optical ($S_{cos}$) signal by further phase shifting at least one of the phase-shifted signals and adding the further phase-shifted signals, wherein the further phase shift is chosen in such a way that the second combined signal is proportional to $E_{in}\cdot\cos(\varphi)$;
    (d) phase-shifting the first combined optical signal ($S_{sin}$) by a selectable value for a first additional phase shift ($\varphi 2$) of zero or $\pi$ and phase-shifting the second combined optical signal by a selectable value for a second additional phase shift ($\varphi 3$) of zero or $\pi$;
    (e) creating at least one optical output signal ($S_{out,1}$, $S_{out,2}$) by adding the first and second additionally phase-shifted combined signals, wherein the first and/or second combined signal reveal a phase relation or wherein the first and/or second combined signals are further phase-shifted in such a way that the complex amplitude of the electrical signal of the optical output signal ($S_{out,1}$, $S_{out,2}$) is proportional to:

(i) $[\cos(\varphi)\cdot e^{j\varphi 3}+j\cdot\sin(\varphi)\cdot e^{j\varphi 2}]$      (alternative 1)

or (ii) $[\cos(\varphi)\cdot e^{j\varphi 3}-j\cdot\sin(\varphi)\cdot e^{j\varphi 2}]$      (alternative 2)

wherein j designates the imaginary unit; and
    (f) selecting the first and second additional phase shift ($\varphi 2$, $\varphi 3$), depending on the desired phase shift ($\varphi_{tot}$) and the absolute value ($\varphi$) of the predetermined phase shift (+$\varphi$, -$\varphi$), if the at least one optical output signal ($S_{out,1}$, $S_{out,2}$) is created according to alternative 1, as follows:
        (i) selecting a value of zero for both additional phase shifts ($\varphi 2$, $\varphi 3$) if the desired phase shift ($\varphi_{tot}$) is within a range from zero to $\pi/2$ plus a positive integer times $2\pi$;
        (ii) selecting a value of zero for the first additional phase shift ($\varphi 2$) and a value of $\pi$ for the second additional phase shifts ($\varphi 3$) if the desired phase shift ($\varphi_{tot}$) is within a range from $\pi/2$ to $\pi$ plus a positive integer times $2\pi$;
        (iii) selecting a value of $\pi$ for both additional phase shifts ($\varphi 2$, $\varphi 3$) if the desired phase shift ($\varphi_{tot}$) is within a range from $\pi$ to $3/2\cdot\pi$ plus a positive integer times $2\pi$, and
        (iv) selecting a value of $\pi$ for the first additional phase shifts ($\varphi 2$) and a value of zero for the second additional phase shifts ($\varphi 3$) if the desired phase shift ($\varphi_{tot}$) is within a range from $3/2\cdot\pi$ to $2\pi$ plus a positive integer times $2\pi$; or
    (g) selecting the first and second additional phase shift ($\varphi 2$, $\varphi 3$), depending on the desired phase shift ($\varphi_{tot}$) and the absolute value ($\varphi$) of the predetermined phase shift (+$\varphi$, -$\varphi$) if the at least one optical output signal ($S_{out,1}$, $S_{out,2}$) is created according to alternative 2, as follows:
        (i) selecting a value of $\pi$ for the first additional phase shift ($\varphi 2$) and a value of zero for the second additional phase shift ($\varphi 3$) if the desired phase shift ($\varphi_{tot}$) is within a range from zero to $\pi/2$ plus a positive integer times $2\pi$;
        (ii) selecting a value of $\pi$ for both additional phase shifts ($\varphi 2$, $\varphi 3$) if the desired phase shift ($\varphi_{tot}$) is within a range from $\pi/2$ to $\pi$ plus a positive integer times $2\pi$;
        (iii) selecting a value of zero for the first additional phase shift ($\varphi 2$) and a value of $\pi$ for the second additional phase shifts ($\varphi 3$) if the desired phase shift ($\varphi_{tot}$) is within a range from $\pi$ to $3/2\cdot\pi$ plus a positive integer times $2\pi$, and
        (iv) selecting a value of zero for both additional phase shifts ($\varphi 2$, $\varphi 3$) if the desired phase shift ($\varphi_{tot}$) is within a range from $3/2\cdot\pi$ to $2\pi$ plus a positive integer times $2\pi$.

17. A method for endless shifting of an optical input signal by a desired phase shift comprising:
    (a) splitting the optical input signal ($S_{in}$) and phase-shifting the split optical input signals by a predetermined positive and negative phase shift (+$\varphi$, -$\varphi$), respectively, wherein the absolute value ($\varphi$) of the predetermined phase shift lies within a range of zero and $\pi/2$;
    (b) creating a first combined optical signal ($S_{sin}$) by further phase-shifting at least one of the phase shifted signals and adding the further phase-shifted signals, wherein the further phase shift is chosen in such a way that the first combined signal ($S_{sin}$) is proportional to $E_{in}\cdot\sin(\varphi)$, wherein $E_{in}$ designates the complex amplitude of the electrical field of the optical input signal ($S_{in}$);
    (c) creating a second combined optical signal ($S_{cos}$) by further phase-shifting at least one of the phase-shifted signals and adding the further phase-shifted signals, wherein the further phase shift is chosen in such a way that the second combined signal is proportional to $E_{in}\cdot\cos(\varphi)$;
    (d) phase-shifting the first combined optical signal ($S_{sin}$) by a selectable value for an additional phase shift ($\varphi 2$) of zero or $\pi$;
    (e) creating at least one optical output signal ($S_{out,1}$, $S_{out,2}$) by adding the first additionally phase-shifted combined signal and the second combined signal, wherein the first and/or second combined signals reveal a phase relation or wherein the first and/or second combined signals are further phase shifted in such a way that the complex amplitude of the electrical signal of the optical output signal ($S_{out,1}$, $S_{out,2}$) is proportional to:

(i) $[\cos(\varphi)+j\cdot\sin(\varphi)\cdot e^{j\varphi 2}]$      (alternative 1)

or (ii) $[\cos(\varphi)-j\cdot\sin(\varphi)\cdot e^{j\varphi 2}]$      (alternative 2)

wherein j designates the imaginary unit; and (f) selecting the additional phase shift ($\varphi 2$), depending on the desired phase shift ($\varphi_{tot}$) and the absolute value ($\varphi$) of the predetermined phase shift ($+\varphi$, $-\varphi$) if the at least one optical output signal ($S_{out,1}$, $S_{out,2}$) is created according to alternative 1, as follows:
  (i) selecting a value of zero for the additional phase shift ($\varphi 2$) if the desired phase shift ($\varphi_{tot}$) is within a range from zero to $\pi$ plus a positive integer times $2\pi$;
  (ii) selecting a value of $\pi$ for the additional phase shift ($\varphi 2$) if the desired phase shift ($\varphi_{tot}$) is within a range from $\pi$ to $2.\pi$ plus a positive integer times $2\pi$, or
(g) selecting the additional phase shift ($\varphi 2$), depending on the desired phase shift ($\varphi_{tot}$) and the absolute value ($\varphi$) of the predetermined phase shift ($+\varphi$, $-\varphi$) if the at least one optical output signal ($S_{out,1}$, $S_{out,2}$) is created according to alternative 2, as follows:
  (i) selecting a value of $\pi$ for the additional phase shift ($\varphi 2$) if the desired phase shift ($\varphi_{tot}$) is within a range from zero to $\pi$ plus a positive integer times $2\pi$;
  (ii) selecting a value of zero for the additional phase shift ($\varphi 2$) if the desired phase shift ($\varphi_{tot}$) is within a range from $\pi$ to $2\cdot\pi$ plus a positive integer times $2\pi$.

\* \* \* \* \*

UNITED STATES PATENT AND TRADEMARK OFFICE
CERTIFICATE OF CORRECTION

PATENT NO. : 11,476,948 B2
APPLICATION NO. : 17/005393
DATED : October 18, 2022
INVENTOR(S) : Michael Eiselt Page 1 of 1

It is certified that error appears in the above-identified patent and that said Letters Patent is hereby corrected as shown below:

In the Claims

Column 16, Line 48, Claim 14, delete "(SΦ,2)" and insert -- (SΦ2) --

Column 16, Line 62, Claim 15, delete "(SΦ,2)" and insert -- (SΦ2) --

Column 17, Line 41, Claim 16, delete "[cos(φ)·$e^{j\varphi 3}$+$j$+sin(φ)·$e^{j\varphi 2}$]" and insert -- $[cos(\varphi) \cdot e^{j\varphi 3} + j - sin(\varphi) \cdot e^{j\varphi 2}]$ --

Signed and Sealed this
Twentieth Day of December, 2022

*Katherine Kelly Vidal*

Katherine Kelly Vidal
*Director of the United States Patent and Trademark Office*